March 29, 1966    F. J. ZAVASNIK    3,242,720
APPARATUS FOR DETERMINING RHEOLOGICAL PROPERTIES
Filed Sept. 30, 1963
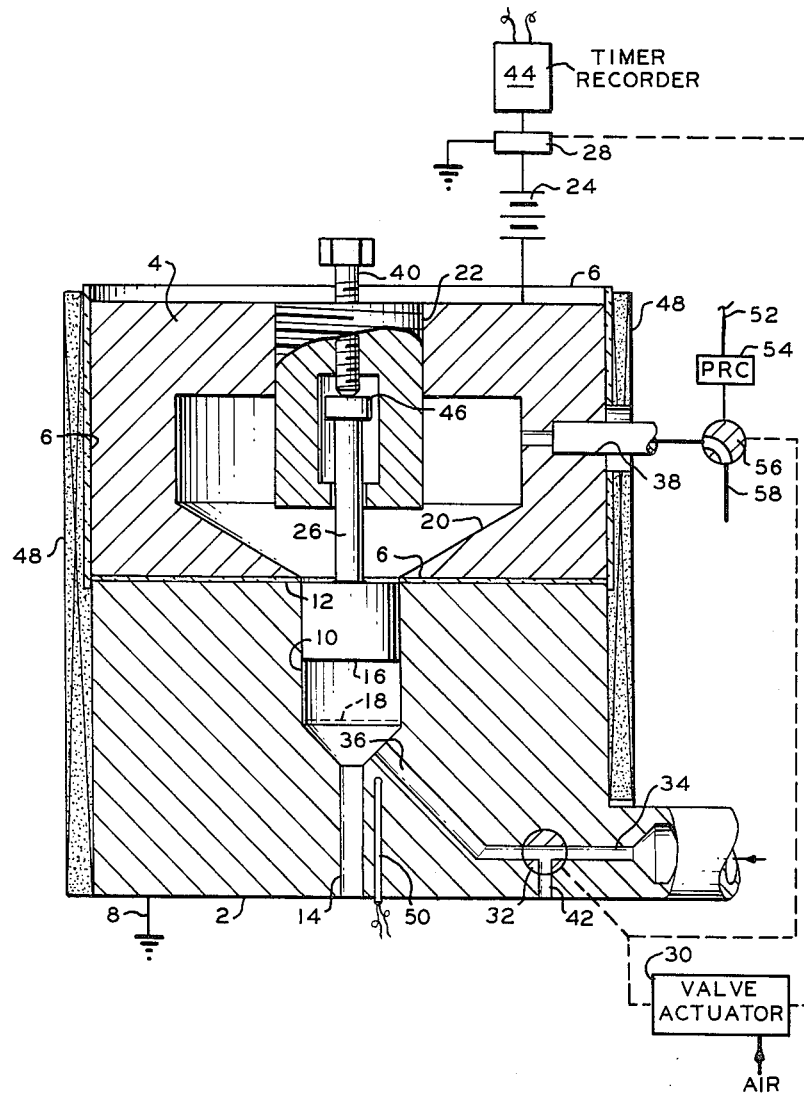
INVENTOR.
F.J. ZAVASNIK
BY *Young and Quigg*
ATTORNEYS United States Patent Office 3,242,720
Patented Mar. 29, 1966

3,242,720
APPARATUS FOR DETERMINING
RHEOLOGICAL PROPERTIES
Fred J. Zavasnik, Bartlesville, Okla., assignor to Phillips
Petroleum Company, a corporation of Delaware
Filed Sept. 30, 1963, Ser. No. 312,702
5 Claims. (Cl. 73—56)

This invention relates to apparatus for determining rheological properties. In one aspect the invention relates to apparatus for the determination of the melt index or melt flow of polymeric materials. In another aspect the invention relates to apparatus for continuously measuring a rheological property of viscous polymeric materials which is a function of molecular weight and/or degree of cross-linking.

In the preparation of fluids and semi-solids such as normally solid polymers of 1-olefins, certain rheological properties are frequently utilized for control purposes. One of these rheological properties more usually employed is melt index or melt flow which characterizes the processability of the polymers and is also an indication of polymer molecular weight. The melt index of polyethylene is measured normally according to the ASTM test D–1238–57T. In this test the rate of extrusion in grams per 10 minutes (through an orifice 0.0825 inch in diameter and 0.315 inch in length) is determined for the polymer at 190° C. under the weight of a piston having a diameter of 0.373 inch and weighing 2160 grams. The melt flow of polypropylene is determined by the same procedure except at a temperature of 230° C. according to ASTM D–1238–57T condition L (from 1962 ASTM preprint). The apparatus utilized for determining melt index is defined in ASTM manual as a "dead-weight piston plastometer." As used in the following discussion the term melt index includes melt flow and defines the polymer property determined according to the procedure set forth in ASTM D–1238–57T at the temperature appropriate to the polymer.

The employment of these standard plastometers to check and control a polymerization process or polymer finishing operations requires the presence of a lab technician to conduct these tests. Due to variations in measurement technique by a specific operator from day to day the errors in measurement due to the human element compound the errors inherent in the ASTM apparatus and result in melt index values with wide variation even on identical samples. This lack of confidence in reproducability of melt index values along with the required presence of a technician to conduct the test limits the amount of data that can be collected and relied upon so that a production facility can determine its operating variables and the effects of change in these variables in the resultant polymer product.

A modification of the ASTM method and apparatus has now been found which will permit the collection and recording of data with a minimum of human attention and with a satisfactory minimum variation of melt index values on identical material.

It is an object of the invention to provide apparatus for measuring a rheological property of viscous materials.

It is another object of the invention to provide apparatus for measuring melt index of polymeric materials.

Another object of the invention is to provide apparatus for continuously measuring a property of a polymeric material which is a function of polymer melt index.

It is still another object of the invention to provide apparatus for continuously measuring and indicating melt index.

These and other objects of the invention become readily apparent from the following detailed description, drawing and appended claims.

The foregoing objects are broadly achieved in one aspect by an apparatus for determining a rheological property of a viscous material comprising in combination a chamber, an outlet in an end portion of said chamber, a close fitting reciprocable piston within said chamber, an inlet to said end portion of said chamber, means for applying constant pressure to the surface of said piston opposite said end portion, a valve means in said inlet, means for actuating said valve to the open position, means for closing said valve, means for measuring the time interval for the piston to move a predetermined distance within said chamber, said time interval being indicative of a rheological property of viscous material introduced into said chamber through said inlet and forced out through outlet by said piston.

For the purpose of more clearly describing the invention and providing a better understanding thereof reference is made to the accompanying drawing which is a diagrammatic illustration of a suitable embodiment of the invention.

The melt index determining device of this invention is preferably an automatic device comprising a gas-driven piston flow measuring device for determining resistance to flow of fluid through an orifice of known cross section provided with a means for automatically recharging and initiating the measuring cycle. The device measures the weight rate of flow by accurately measuring the time to extrude a known volume of polymer through a standard orifice. Since the volume rate can be accurately determined and density is constant and known, the weight rate can be calculated accurately. Since the piston and orifice dimensions may be the same as those used in the ASTM lab apparatus, the values obtained are correlatable to those obtained by the ASTM lab apparatus for melt index. However, the size of the chamber, piston, pressure on the piston, orifice diameter may all be independently changed to provide an almost limitless range for the instrument. If desired, the device can be automatically controlled so as to adjust the pressure on the piston after any desired number of runs have been made so that properties at various pressures may be determined in sequence automatically.

The apparatus basically comprises two electrically conductive members 2 and 4 separated from each other and from exterior components by high temperature electrical insulation 6. Although the apparatus is positioned to show one member directly above the other member, the members could be adjacent each other in any position although the vertical position enhances flow of the polymer from the chamber. The lower member 2 is grounded by conduit 8. Said lower member 2 contains a cavity 10 which is preferably cylindrical and which is open to the upper face 12 of said lower member. At the lower end of the cylindrical cavity is a passager 14 to the exterior of said lower member 2 for the discharge of the polymer. Said passageway is of known cross-section and length so that the time for the polymer discharge may be calibrated directly in units of weight per unit of time. Within the cavity in said lower member 2 is a closely fitting reciprocal piston 16. It is most convenient if member 2 is so constructed as to permit easy access to the chamber 10 and piston 16. The entire member may be readily constructed to permit replacement of sections so that the passageway 14 and chamber 10 may be independently changed.

At a selected time designated 0 time, the piston 16 is at its lowest point of travel (the dotted line shown in the drawing just over the passageway 14 and designated as 18). A portion 46 of extension 26 on the upper end of the piston extending through the electrical installation 6 and through the cavity 20 in said upper member 4 contacts a positive contact 22 at the lower end of its travel so that the circuit is closed. As shown in the diagram an electrical current is thus caused to pass from the 12-volt D.C. source 24 through the upper member 4, contact member 22, portion 46, extension 26, piston 16, and lower member 2 through the ground 8, then through sequencer 28 to the other side of the D.C. source.

A sequencer package is a device for completing and breaking electrical circuits sequentially with each impulse from a single source. A simple set up would be a rotary multiple contact electrical switch operated by a solenoid and ratchet. This results in the sequencer package 28 actuating the air-driven rotary actuator 30 to turn the polymer flow control valve 32 to the fill position. The valve is shown in the fill position in the drawing.

With the valve in the full position molten polymer from an extruder or other source (not shown) flows through conduit 34, valve 32, and conduit 36 into the lower portion of the chamber 10 below piston 16. This forces the piston 16 upward against nitrogen pressure in chamber 20, since the flow in through conduit 36 is at a higher rate than flow out through passage 14. Nitrogen is introduced from a source (not shown) through conduit 52, pressure regulator 54, valve 56 and conduit 38. Any means for maintaining a constant pressure on the upper surface of piston 16 during the discharge stroke or read position is within the scope of the invention. For example, any inert gas could be employed. When the polymer is being introduced through line 36, valve 56 is turned to permit venting of the gas thru vent line 58 from chamber 20. In addition a constant weight on the upper surface of the piston would be satisfactory. However, due to its fluidity, it is preferred that a gas or other fluid be employed, since the balance in pressure prevents leakage of the polymer around the piston into chamber 20. When the piston reaches a predetermined position at the upper extremity of cavity 10 as determined by a contactor screw 40, the circuit is again closed and the sequencer package 28 causes the air-driven rotary actuator 30 to turn the polymer flow control valve 32 to the read position and to turn valve 56 to reintroduce gas to chamber 20 thus raising the pressure to the desired value. At this point the polymer from the source is then discharged through conduit 42 and the polymer flow to the chamber 10 is thus shut off.

With the termination of the polymer flow to the chamber, the polymer pressure in the chamber decreases rapidly until the nitrogen pressure again is the dominating pressure and the piston moves downward. As soon as the piston starts moving downward, the switch end of the piston breaks the circuit. At this interruption of the circuit the printing counter, which may be a timer recorder 44 powered by 110 v. A.C., is actuated by the sequencer and begins counting. The timing is terminated when the piston has extruded the known volume of polymer in the chamber 10 through the orifice 14, which has a known cross section. At this point the circuit is again completed, due to the contact of the upper end 46 of the extension of the piston 16 with a contactor 22, the sequencer is actuated, thereby stopping the printing counter and returning the fill valve to its fill position. The cycle is then repeated indefinitely.

A resistance electrical heating band or any other heating means for heating the members 2 and 4 is provided such as the resistance electrical heater band 48. A thermocouple or other temperature sensing means may be provided such as thermocouple 50.

EXAMPLE I

To demonstrate the effectiveness of the apparatus a number of tests were made employing polypropylene fluff prepared by the mass polymerization of propylene in liquid propylene with a diethylaluminum chloride-titanium trichloride complex, said complex prepared by the reaction of titanium tetrachloride with aluminum.

An overnight unattended operation (12 hours duration) resulted in 260 melt index determination values run at 230° C. Ninety-five percent of the melt index values obtained from these runs were contained in a melt index range of 1.14 to 1.22. This is a spread of ±3.5 percent based on a mean value of 1.18 melt index.

EXAMPLE II

Twenty determinations were made of melt flow on the above polypropylene at 230° C. in the apparatus of this invention employing standard ASTM orifice, piston and chamber sizes. The minimum value determined was 6.98 and the maximum of 7.11 for a range of 0.13. The polymer came directly from an extruder and the polypropylene fluff fed to the extruder had not been treated with an antioxidant. Untreated polypropylene fluff was then subjected to standard test procedures according to ASTM D-1238-57T. Three values were determined: 8, 12, and 15 in order of their determination. The lack of reproducibility on the untreated polymer is self-evident. Three standard ASTM determinations made on said polypropylene which had been sprayed with an antioxidant (0.1 percent Santonox, 0.2 percent dilaurylthiodipropionate) yielded values of 6.21, 5.88, and 6.04. Although better, the range of 0.33 is twice as great as that with the claimed device. More important, this points up a major advantage, namely, the removal of extraneous variables such as handling, oxidation, etc.

In addition, the automatic melt indexer of this invention has shown the ability to measure polymer quality since gel particles in the melt will result in the indexer providing a very erratic low melt index value. A number of low melt index values and the frequency of the low values is an indication of the amount of gel particles in the stream and therefore the quality of the polymer melt.

The preceding discussion has been directed to certain embodiments of the invention as illustrated by the drawing. This is not intended, however, in any limiting sense and it is within the scope of the invention to employ other suitable equivalent apparatus for carrying out the invention. Many variations and modifications are within the scope of the invention.

I claim:

1. Apparatus for determining a rheological property of a viscous material comprising in combination a chamber, an outlet in an end portion of said chamber, a close fitting reciprocable piston within said chamber, an inlet to said end portion of said chamber, means for applying constant pressure to the surface of said piston opposite said end portion, valve means in said inlet, means for actuating said valve to the open position, means for closing said valve, means for measuring the time interval for the piston to move a predetermined distance within said chamber, said time interval being indicative of a rheological property of a fluid introduced into said chamber and expelled through said outlet by said piston.

2. The apparatus of claim 1 wherein said means for applying pressure comprises a gas filled chamber positioned adjacent said surface.

3. Apparatus for determining melt index of a polymer comprising, in combination, a constant volume chamber, an outlet of known cross-section and length in the lower portion of said chamber, a first inlet to the lower portion of said chamber, a close fitting reciprocable piston disposed within said chamber, a second inlet in an upper portion of said chamber, conduit means for introducing a fluid through said second inlet, pressure controlling means for maintaining substantially constant pressure on the upper surface of said piston, valve means in said first inlet, means for actuating said valve means to the open position when said piston attains a predetermined position in the lower portion of said chamber thereby permitting fluid to enter the lower portion of said chamber and force said piston to the upper portion of said chamber by overcoming the pressure on the upper surface of said piston, means for closing said valve means when said piston attains a predetermined position in said upper portion of said chamber, the pressure on said upper surface of said piston thereafter forcing the piston to said lower portion, timing means for measuring the time interval for said piston to move from said predetermined position in the upper portion to said predetermined position in the lower portion of said chamber, said fluid thus being forced out of said chamber through said outlet, said time interval being representative of the melt index of said fluid forced out through said outlet.

4. The apparatus of claim 3 wherein means are provided for heating said chamber and piston to a constant uniform temperature.

5. Apparatus for determining melt index of a polymer comprising, in combination, a first electrically conductive member, means for grounding said first member, a cylindrical cavity in said first member opening in one face thereof with the opposite end of said cavity connected by a first passageway to the exterior of said first member, a second passageway in said first member in communication with the end portion of said cavity adjacent said first passageway, a valve positioned in said second passageway, a source of fluid in communication with said valve, a discharge conduit in communication with said valve, a second electrical conductive member adjacent said face of said first member, means for electrically insulating said first member from said second member, a second cavity in said second member opening onto the face of said second member adjacent said first member contiguous with said cylindrical cavity in said first chamber, a closely fitting reciprocable piston disposed in said cylindrical cavity, an extension of said piston extending into said second cavity but not touching said second member except when said piston is at the upper and lower extremities of its travel within said cylindrical cavity, a third fluid passageway in said second member in communication with said second cavity, means for controlling the pressure on the surface of said piston adjacent said second member, means for heating said first and second members to a substantially uniform temperature, timing means for measuring the period of time required for said piston to move from said upper extremity of its travel to said lower extremity of its travel, means for applying an electrical current to said second member, means for opening said valve to said second passageway and terminating said timing means when said piston reaches said lower extremity of its travel and establishes electrical contact between said first and second members, means for closing said valve to said second passageway and opening said valve to said discharge conduit when said piston reaches said upper extremity of its travel and establishes electrical contact between said first and second members, and means for initiating said timing means when said piston begins to move from said upper extremity of its travel towards said first passageway.

References Cited by the Examiner

UNITED STATES PATENTS

| | | | |
|---|---|---|---|
| 2,503,660 | 4/1950 | Exline et al. | 73—56 |
| 2,659,433 | 11/1953 | Brown | 73—38 X |
| 2,780,096 | 2/1957 | Noble et al. | 73—56 X |
| 3,074,266 | 1/1963 | Sadler et al. | 73—55 |

LOUIS R. PRINCE, *Primary Examiner.*

DAVID SCHONBERG, *Examiner.*